United States Patent
Avivi et al.

(10) Patent No.: US 8,964,914 B2
(45) Date of Patent: Feb. 24, 2015

(54) DEVICE, SYSTEM AND METHOD OF COMBINING RECEIVED WIRELESS COMMUNICATION SIGNALS

(75) Inventors: Rotem Avivi, Petah-Tiqwa (IL); Assaf Gurevitz, Ramat Hasharon (IL); Tzahi Weisman, Mevaseret (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,071

(22) PCT Filed: Aug. 30, 2011

(86) PCT No.: PCT/US2011/049794
§ 371 (c)(1),
(2), (4) Date: Sep. 15, 2013

(87) PCT Pub. No.: WO2013/032452
PCT Pub. Date: Mar. 7, 2013

(65) Prior Publication Data
US 2013/0343500 A1 Dec. 26, 2013

(51) Int. Cl.
*H04B 1/10* (2006.01)
*H04B 7/08* (2006.01)
(Continued)

(52) U.S. Cl.
CPC ............. *H04B 7/0885* (2013.01); *H04L 1/06* (2013.01); *H04B 7/0669* (2013.01); *H04B 7/084* (2013.01)
USPC ............ 375/349; 370/442; 375/324; 375/347

(58) Field of Classification Search
CPC ...... H04B 1/123; H04B 7/084; H04B 7/0669; H04L 1/06; H04L 1/0618
See application file for complete search history.

(56) References Cited

U.S. PATENT DOCUMENTS

| 6,104,762 A | * | 8/2000 | Fujimura | 375/324 |
| 7,003,263 B2 | * | 2/2006 | Fischer et al. | 455/63.1 |
| 2002/0105961 A1 | * | 8/2002 | Hottinen et al. | 370/442 |

(Continued)

FOREIGN PATENT DOCUMENTS

| CN | 1350732 | 5/2002 |
| CN | 1447534 | 10/2003 |

(Continued)

OTHER PUBLICATIONS

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

(Continued)

*Primary Examiner* — Leon-Viet Nguyen
(74) *Attorney, Agent, or Firm* — Shichrur & Co.

(57) ABSTRACT

Some demonstrative embodiments include devices, systems and/or methods of combining received wireless communication signals. For example, a device may include a radio-frequency (RF) combiner to combine first and second wireless communication RF signals of a wireless communication frame received via first and second respective antennas, into a combined signal; and a base-band phase estimator to estimate a phase difference between the first and the second antennas, and to provide to the RF combiner a feedback corresponding to the phase difference, wherein the radio-frequency combiner is to combine the first and the second RF signals according to the feedback.

15 Claims, 3 Drawing Sheets

(51) Int. Cl.
*H04L 1/06* (2006.01)
*H04B 7/06* (2006.01)

(56) References Cited

U.S. PATENT DOCUMENTS

| | | | |
|---|---|---|---|
| 2003/0186660 A1* | 10/2003 | Lee | 455/140 |
| 2004/0156349 A1 | 8/2004 | Borisovich et al. | |
| 2004/0219892 A1 | 11/2004 | Vaidyanathan et al. | |
| 2006/0233221 A1 | 10/2006 | Xu et al. | |
| 2007/0140389 A1* | 6/2007 | Lindenmeier et al. | 375/347 |
| 2008/0079634 A1 | 4/2008 | Nakamura | |

FOREIGN PATENT DOCUMENTS

| | | |
|---|---|---|
| CN | 1512693 | 7/2004 |
| CN | 101154979 | 4/2008 |
| WO | 00/72464 | 11/2000 |

OTHER PUBLICATIONS

International Search Report and Written Opinion for PCT/US2011/049794, mailed on Apr. 24, 2012; 10 pages.

International Preliminary Report on Patentability and Written Opinion for PCT International Application No. PCT/US2011/049794, mailed on Mar. 13, 2014, 6 pages.

Office Action for Chinese Patent Application No. 201180073177.9, mailed on Oct. 20, 2014, 21 pages (13 of which are an English translation).

Office Action for Korean Patent Application Serial No. 2014-7004848 mailed on Nov. 17, 2014, 14 pages including 6 pages of English Translation.

* cited by examiner

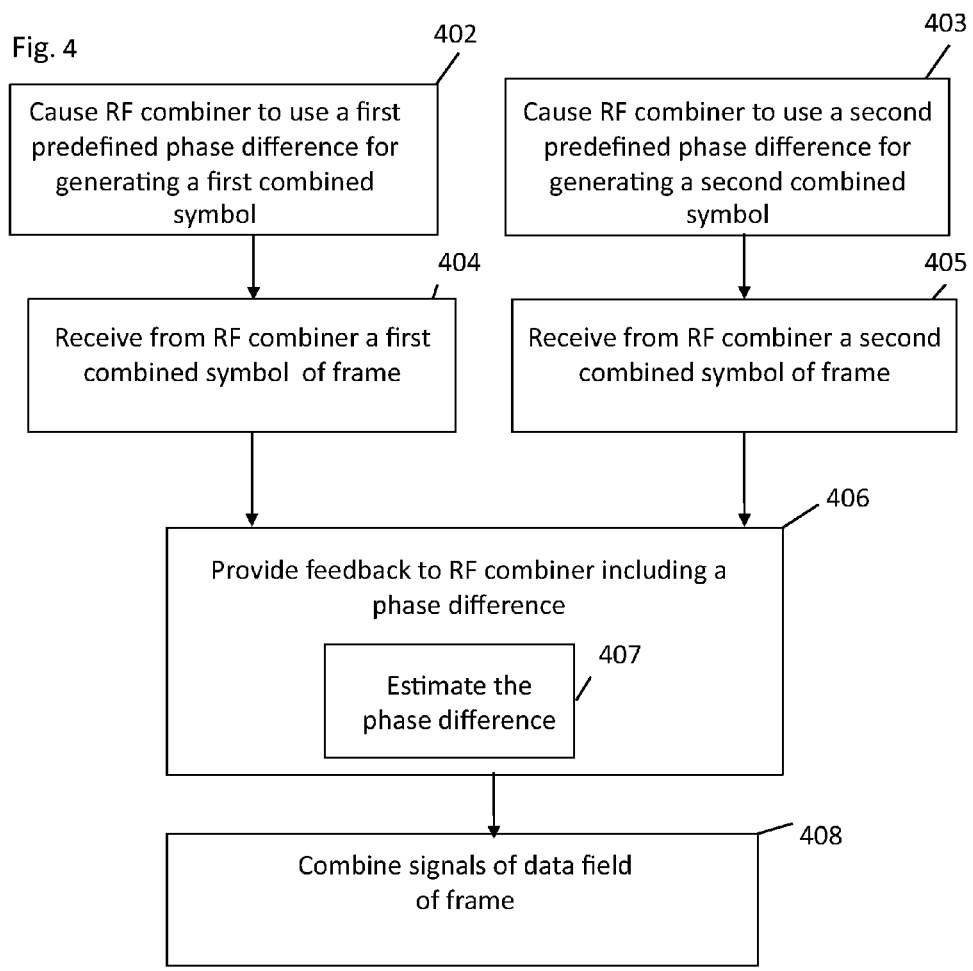

DEVICE, SYSTEM AND METHOD OF COMBINING RECEIVED WIRELESS COMMUNICATION SIGNALS

CROSS REFERENCE

This application is a National Phase Application of PCT International Application No. PCT/US2011/049794, International Filing Date Aug. 30, 2011, the entire disclosure of which is incorporated herein by reference.

BACKGROUND

A wireless communication receiver may utilize a plurality of receive chains, e.g., to improve performance of the receiver and/or the quality of a received wireless communication signal.

For example, the receiver may include first and second, e.g., parallel, receive chains to simultaneously receive the wireless communication signal.

The receiver may be configured to coherently combine first and second signals received via the first and second receive chains.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic flow chart illustration of a method of combining received wireless communication signals, in accordance with some demonstrative embodiments.

DETAILED DESCRIPTION

Figure 1:
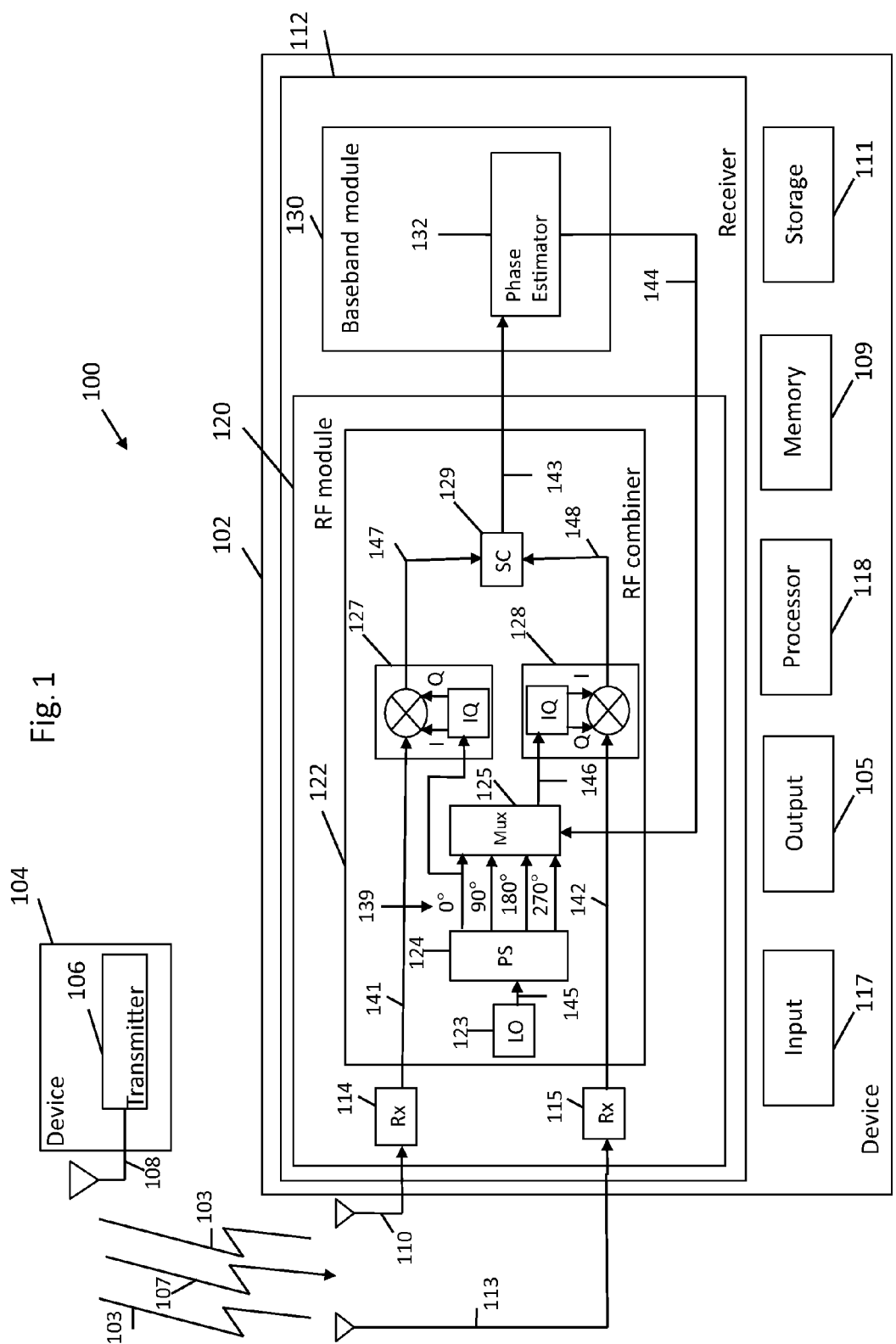
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 802.11-2007:Standard for Information technology—Telecommunications and information exchange between systems—Local and metropolitan area networks—Specific requirements*, Part 11: *Wireless LAN Medium Access Control (MAC) and Physical Layer (PHY) Specifications—June 2007*), 802.11n ("*IEEE 802.11n-2009Amendment 5: Enhancements for Higher Throughput. IEEE-SA. 29 Oct. 2009*"), 802.11ac ("*Very High Throughput <6 Ghz*"), 802.11 task group ad (TGad) ("*Very High Throughput 60 GHz*"), and/or future versions and/or derivatives thereof, devices, and/or networks operating in accordance with IEEE 802.16 standards ("the 802.16 standards"), e.g., including 802.16 (*IEEE-Std 802.16, 2004 Edition, Air Interface for Fixed Broadband Wireless Access Systems*), 802.16d, 802.16e (*IEEE-Std 802.16e, 2005 Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Reference is now made to FIG. 1, which schematically illustrates a block diagram of a wireless communication system 100, in accordance with some demonstrative embodiments.

In some demonstrative embodiments, system 100 may include one or more devices, e.g., devices 102 and 104, capable of communicating wireless communication signals over a wireless communication channel 103. For example, device 104 may include a transmitter 106 capable of transmitting a wireless communication signal 107 via one or more antennas 108, and/or device 102 may include a receiver 112 capable of receiving wireless communication signal 107. For example, transmitter 106 may transmit an OFDM wireless communication signal via antennas 108, and receiver 112 may receive the OFDM wireless communication signal.

In some demonstrative embodiments, wireless communication channel 103, may include, for example, a radio channel, an IR channel, a RF channel, a Wireless Fidelity (WiFi) channel, and the like.

In some demonstrative embodiments, device 102 may include a RF-module 120, including a plurality of receive (Rx) chains, to simultaneously receive wireless communication signal 107 via a plurality of antennas. For example, receiver 112 may include first and second receive chains 114 and 115 to simultaneously receive signal 107 via first and second respective antennas 110 and 113, e.g., as described below.

In some demonstrative embodiments, Rx chains 114 and 115 may include any suitable Rx chain elements, e.g., any suitable front end elements, filters and the like, to process signals received via antennas 110 and 113.

In some demonstrative embodiments, RF module 120 may include a RF combiner 122 to combine signals received via chains 114 and 115 into a combined RF signal 143, e.g., as described below.

In some demonstrative embodiments, receiver 112 may include a baseband module 130 to process signal 143, e.g., as described below.

In some demonstrative embodiments, antennas 108, 110 and/or 113 may include any type of antennas suitable for transmitting and/or receiving wireless communication signals, blocks, frames, transmission streams, packets, messages and/or data. Types of antennas that may be used for antennas 108, 110 and/or 113 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 108, 110 and/or 113 may implement transmit and receive functionalities using separate transmit and receive antenna elements. In some embodiments, antennas 108, 110 and/or 113 may implement transmit and receive functionalities using common and/or integrated transmit/receive elements.

In some demonstrative embodiments, devices 102 and/or 104 may include, or may be included as part of, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may also include, for example, one or more of a processor 118, an input unit 117, an output unit 105, a memory unit 109, and a storage unit 111. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 118 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 118 executes instructions, for example, of an Operating System (OS) of wireless communication device 102 and/or of one or more suitable applications.

Input unit 117 includes, for example, a keyboard, a keypad, a mouse, a touch-pad, a track-ball, a stylus, a microphone, or other suitable pointing device or input device. Output unit 105 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 109 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 111 includes, for example, a hard disk drive, a floppy disk drive, a Compact Disk (CD) drive, a CD-ROM drive, a DVD drive, or other suitable removable or non-removable storage units. Memory unit 109 and/or storage unit 111, for example, may store data processed by wireless communication device 102.

In some demonstrative embodiments, Rx chain 114 may generate a first analog wireless communication RF signal 141 corresponding to signal 107, as received via antenna 110, and Rx chain 115 may generate a second analog wireless communication RF signal 142 corresponding to signal 107, as received via antenna 113.

In some demonstrative embodiments, baseband module 130 may include a baseband phase estimator 132 configured to estimate a phase difference between first antenna 113 and second antenna 110, and to provide RF combiner 122 a feedback 144, corresponding to the phase difference, e.g., as described below.

In some demonstrative embodiments, RF combiner 122 may combine signal 141 and 142 according to feedback 144, e.g., as described in detail below.

In some demonstrative embodiments, baseband phase estimator 132 may estimate the phase difference based on combined signal 143, e.g., as described in detail below.

In some demonstrative embodiments, baseband phase estimator 132 may estimate the phase difference based on a preamble of signal 107.

In some demonstrative embodiments, baseband phase estimator 132 may cause RF combiner 122 to use a first predefined phase difference for combining a first symbol, e.g., a first training symbol, of signal 141 and a first symbol of signal 142 into a first combined symbol of signal 143, and to use a second predefined phase difference, different from the first phase difference, for combining a second symbol, e.g., a second training symbol, of signal 141 and a second symbol of signal 142 into a second combined symbol of signal 143.

In some demonstrative embodiments, baseband phase estimator 132 may estimate the phase difference based on the first and the second combined symbols of signal 143, e.g., as described below.

In some demonstrative embodiments, the first predefined phase difference and the second predefined phase difference may be separated by 180 degrees.

In some demonstrative embodiments, the first phase difference may include a phase difference of zero degrees, and the second phase difference may include a phase difference of 180 degrees, e.g., as described in detail below.

In some demonstrative embodiments, feedback 144 may include a quantized value of the estimated phase difference.

In some demonstrative embodiments, the quantized value of the estimated phase difference may be selected from a predefined set of quantized phase difference values, e.g., four quantized values as described below.

In some demonstrative embodiments, RF combiner 122 may include a Local Oscillator (LO) 123 configured to generate a frequency signal 145.

In some demonstrative embodiments, RF combiner 122 may include a Phase Shifter (PS) 124 configured to divide signal 145 into at least two, different, signals representing at least two respective quantized phase values. For example, PS 124 may divide signal 145 into four different quantized phase signals 139, e.g., representing four phases of 0, 90, 180 and 270 degrees, denoted 0°, 90°, 180° and 270° respectively.

In some demonstrative embodiments, RF combiner 122 may include a Multiplexer (Mux) 125 including four inputs, e.g., to receive signals 139, and to generate an output signal 146 including one of signals 139, which may be selected according to feedback 144, e.g., as provided by phase estimator 132. For example, signal 146 may include one quantized phase value, e.g., representing a phase difference to be applied for combining signals 141 and 142.

In some demonstrative embodiments, RF combiner 122 may include a first Down Converter (DC) 127 and a second down converter 128, configured to down convert signals 141 and 142 into signals 147 and 148, respectively, using signals 139.

For example, first down converter (DC) 127 may include a mixer and a IQ demodulator configured to down convert signal 141 into signal 147 using a first signal of signals 139, e.g., the signal corresponding to a phase difference of zero degrees.

For another example, second DC 128 may include a mixer and a IQ demodulator configured to down convert signal 142 into signal 148 using output signal 146, e.g., the signal corresponding to the selected signal of signals 139.

In some demonstrative embodiments, RF combiner 122 may include a Signal Combiner (SC) 129 configured to combine signal 147 and signal 148 into combined signal 143. For example, SC 129 may coherently combine signal 147 and signal 148, using an adder.

In some demonstrative embodiments, baseband phase estimator 132 may estimate the phase difference between first antenna 113 and second antenna 110 according to signal 143, and may provide RF combiner 122 with feedback 144 corresponding the estimated phase difference, e.g., as described in detail below.

In some demonstrative embodiments, baseband phase estimator 132 may estimate the phase difference based on a preamble of signal 107, as received via antennas 113 and 110, e.g., as described below.

Figure 2:
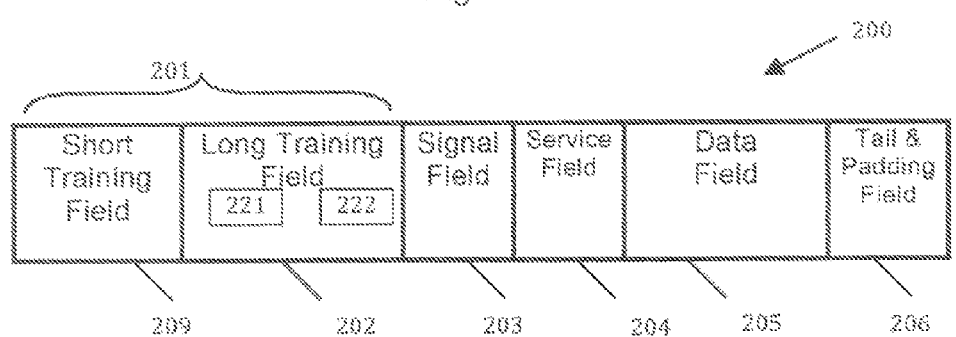
FIG. 2 is a schematic illustration of a structure of a wireless communication signal, in accordance with some demonstrative embodiments.

Reference is now made to FIG. 2, which schematically illustrates a structure 200 of a wireless communication RF signal, in accordance with some demonstrative embodiments. For example, signal 107 (FIG. 1) may have structure 200.

As shown in FIG. 2, structure 200 may include a preamble 201, a signal field 203, a service field 204, a data field 205 and a tail and padding field 206.

In some demonstrative embodiments, preamble 201 may include a Short Training Field (STF) 209, and a Long Training Field (LTF) 202, e.g., as defined by the IEEE 802.11 specifications.

In some demonstrative embodiments, LTF 202 may include at least one training symbol. For example, LTF 202 may include at least a first symbol 221 and a second symbol 222, e.g., as defined by the IEEE 802.11 specifications.

Referring back to FIG. 1, in some demonstrative embodiments, baseband phase estimator 132 may cause RF combiner 122, e.g., when receiving LTF 202 (FIG. 2) of signal 107, to use a first phase difference of 0 degrees, for combining a first symbol of signal 141, e.g., corresponding to symbol 221 (FIG. 2), and a first symbol of signal 142, e.g., corresponding to symbol 221 (FIG. 2), into a first combined symbol, denoted '$y_0$', of signal 143, e.g., corresponding to symbol 221 (FIG. 2).

In some demonstrative embodiments, baseband phase estimator 132 may cause RF combiner 122, e.g., when receiving LTF 202 (FIG. 2) of signal 107, to use a second phase difference of 180 degrees, for combining a second symbol of signal 141, e.g., corresponding to symbol 222 (FIG. 2), and a second symbol of signal 142, e.g., corresponding to symbol 222, into a second combined symbol, denoted '$y_1$', of signal 143, e.g., corresponding to symbol 222 (FIG. 2).

For example, when processing symbol 221 (FIG. 2) of signal 107, baseband phase estimator 132 may provide RF combiner 122 with feedback 144 to cause multiplexer 125 to provide DC 128 with signal 146 corresponding to a phase of zero degrees, while DC 127 applies a phase of zero degrees, such that RF combiner 122 uses a phase difference of zero degrees to generate combined symbol $y_0$.

When processing symbol 222 (FIG. 2) of signal 107, baseband phase estimator 132 may provide RF combiner 122 with feedback 144 to cause multiplexer 125 to provide DC 128 with signal 146 corresponding to a phase of 180 degrees, while DC 127 applies a phase of zero degrees, such that RF combiner 122 uses a phase difference of 180 degrees to generate combined symbol $y_1$.

In some demonstrative embodiments, the first combined symbol $y_0$ and the second combined symbol $y_1$ may be represented as a function of a channel response of channel 103, and noise, e.g., as follows:

$$y_0 = h_{0,0}S_0 + n_{0,0} + h_{1,0}S_1 + n_{1,0} \quad (1)$$

$$y_1 = h_{0,1}S_0 + n_{0,1} - h_{1,1}S_1 - n_{1,1} \quad (2)$$

wherein $h_{i,j}$ denotes a channel response corresponding to an i-th antenna, i=0, 1, and a j-th symbol, j=0, 1; wherein $S_j$ denotes the i-th symbol as transmitted by transmitter 106; and wherein $n_{i,j}$ denotes the noise sample of the i-th antenna and the j-th symbol. It may be seen from Equation 1, that the combined symbol $y_0$ includes a combination of two first LTF symbols, as received from antennas 110 and 113, respectively, combined with a phase difference of zero degrees, e.g., a first phase of zero degrees and a second phase of zero degrees, whereas the combined symbol yl corresponds to a combination of two second LTF symbols, as received from antennas 110 and 113, respectively, combined with a phase difference of 180 degrees, e.g., a first phase of zero degrees and a second phase of 180 degrees.

In some demonstrative embodiments, the channel response of channel 103 may be assumed to be constant with respect to the two symbols, e.g., as follows:

$$h_{0,0} = h_{0,1}$$

$$h1,0 = h1, \quad (3)$$

In some demonstrative embodiments, a channel response of the first and second antennas may be determined based on the first and second combined signals $y_0$ and $y_1$. For example, the following equation may be determined by summing Equation 1 and Equation 2, e.g., as follows:

$$y_0 + y_1 = 2*h_0 S_0 + n_{0,0} + n_{1,0} + n_{0,1} + n_{1,1} \quad (4)$$

For example, phase estimator 132 may determine the channel response $h_0$ by substituting the symbols $y_0$ and $y_1$ of signal 143 into Equation 4.

In some demonstrative embodiments, the following equation may be determined by subtracting Equation 1 and Equation 2, e.g., as follows:

$$y_0 - y_1 = 2h_1 S_1 + n_{0,0} + n_{1,0} - n_{0,1} - n1,1 \quad (5)$$

For example, phase estimator 132 may determine the channel response $h_1$ by substituting the symbols $y_0$ and $y_1$ of signal 143 into Equation 5.

In some demonstrative embodiments, phase estimator 132 may determine the phase difference, denoted θ, between antennas 110 and 113, based on the channel responses $h_0$ and $h_1$, e.g., as described below.

In some demonstrative embodiments, combined signal 143 may be represented as follows:

$$z = y_0 + e^{j\theta} y_1 = (h_0 + e^{j\theta} h_1)s + v = hs + v \quad (6)$$

wherein z denotes combined signal 143, θ denotes the phase difference, v denotes a function of $n_0$ and $n_1$ and h is defined as $(h_0 + e^{j\theta} h_1)$.

In some demonstrative embodiments, the phase θ may be determined to include a phase, denoted $\theta_m$, at which a Signal to Noise Ratio (SNR) of received signal 107 is maximal. For example, the SNR of signal 107 may be determined as follows:

$$SNR(\theta) = \frac{E\{|h|^2\}}{2\sigma_n^2} \quad (7)$$

wherein E{x} denotes the expectation of x, and wherein a denotes the standard deviation of the noise n.

According to Equation 7, the phase $\theta_m$ may be determined when the nominator of Equation 7 is maximized. The nominator of Equation 7 may be represented as follows:

$$E\{|h|^2\} = E\{|h_0|^2\} + E\{|h_1|^2 + 2\text{Real}\{h_0 h_1^k e^{-j\theta}\}\} = p_0 + p_1 + 2\text{Real}\{e^{-j\theta} r\} \quad (8)$$

wherein $p_i = E\{|h_1|^2\}$, wherein $r = E\{h_0 h_1^*\}$, and wherein $h_1^*$ denotes the conjugate transpose of $h_1$.

According to Equation 8, the phase $\theta_m$ may be determined at a maximal value of the third term of equation 8, for example, since the third term of Equation 8 is the only term that is dependent on the phase $\theta_m$. Accordingly, the phase $\theta_m$ may be determined as follows:

$$\theta_m = \text{phase}\{E(h_0 h_1^*)\} \quad (9)$$

In some demonstrative embodiments, the phase $\theta_m$ may be determined according to Equation 9, for example, by summing a plurality of multiplications over a plurality of tones of signal 107, e.g., as follows:

$$\theta_m = \alpha = \text{phase}\{\Sigma_k^{NumberOfTomeri} h_{ek} h_{1k}^*\} \quad (10)$$

In some demonstrative embodiments, a SNR, denoted $SNR_{FlatCombining}$, corresponding to the phase $\theta_m$, may be determined, for example, by substituting Equation 9 in Equation 7, e.g., as follows:

$$SNR_{FlatCombining} = \frac{E\{(|h_0| + |h_1|)^2\}}{2\sigma_n^2} = \frac{p_0 + p_1 + 2|r|}{2\sigma_n^2} \quad (11)$$

A SNR, denoted $SNR_{MRC}$, of a receiver utilizing a baseband-domain MRC, may be determined, for example, as follows:

$$SNR_{MRC} = \frac{E\{|h_0|^2 + |h_1|^2\}}{\sigma_n^2} = \frac{p_0 + p_1}{\sigma_n^2} \quad (12)$$

Accordingly, a SNR loss, denoted L, defined as a ratio between $SNR_{FlatCombining}$ and $SNR_{MRC}$ may be determined, e.g., as follows:

$$L = \frac{SNR_{MRC}}{SNR_{FlatCombining}} = \frac{2(p_0 + p_1)}{p_0 + p_1 + 2|r|} \qquad (13)$$

In some demonstrative embodiments, phase estimator 132 may cause RF combiner to apply the estimated phase difference $\theta_m$ to data signal field 203 (FIG. 2) of signal 107. For example, phase estimator 132 may provide RF combiner 122 feedback 144 corresponding to the estimated phase difference $\theta_m$, e.g., when data field 203 (FIG. 2) of signal 107 is received by antennas 110 and 113.

Figure 3:
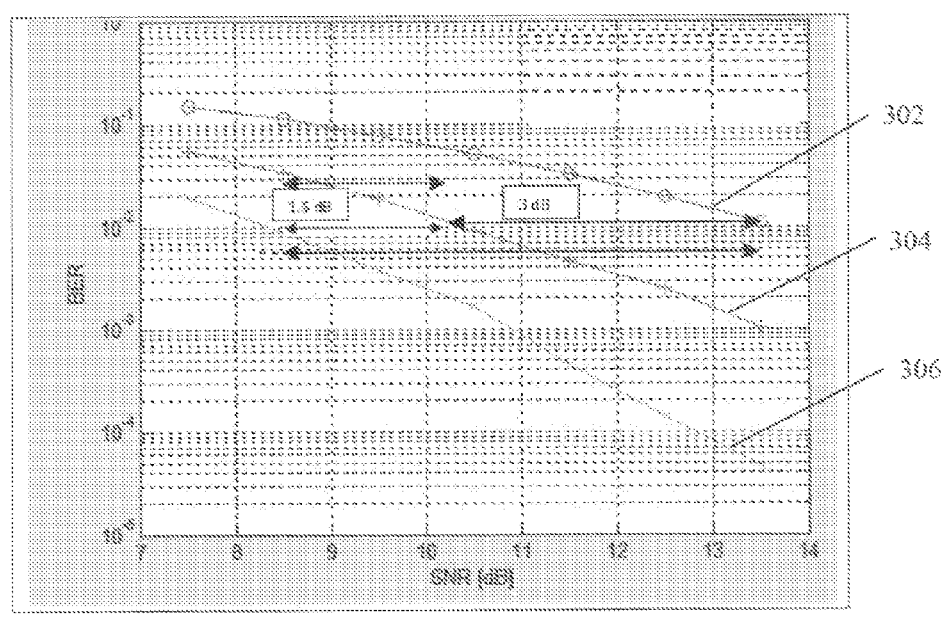
FIG. 3 is a schematic illustration of a graph depicting three receiver performance curves, corresponding to three receiving schemes, respectively, in accordance with some demonstrative embodiments.

Reference is made to FIG. 3, which schematically illustrates a graph depicting receiver performance curves 302, 304 and 306 corresponding to three respective receiver schemes, in accordance with some demonstrative embodiments.

Performance curves 302, 304 and 306 represent Bit-Error-Ratio (BER) values versus SNR.

Curve 302 corresponds to a receiver implementing a Single-In-Single-Out (SISO) receiver scheme; curve 304 corresponds to a receiver implementing a baseband-domain MRC scheme for combining two received signals in the baseband domain; and curve 306 corresponds to a receiver implementing a RF-domain combiner, in accordance with some demonstrative embodiments. For example, curve 306 may correspond to the performance of receiver 112, e.g., as described above.

It may be seen from FIG. 3, that the gain achieved by the RF-domain combiner 304, compared to SISO receiver scheme, as represented by curve 302, is about 3 (decibel) dB. It may also bee seen from FIG. 3, that the gain achieved by the baseband-domain MRC scheme, e.g., as represented by curve 304, is 4.5 dB. Accordingly, most of the gain may be achieved by the RF-domain combiner.

In some demonstrative embodiments, a receiver, e.g., receiver 112 (FIG. 1), may re-estimate the phase difference $\theta$ for each received packet. Alternatively, the receiver may re-estimate the phase difference $\theta$ at predefined intervals, e.g., such that the same phase difference $\theta$ may be applied for combining a predefined sequence of received packets. This scheme may be applied, for example, to limit performance loss, e.g., with respect to the performance of the SISO receiver.

Reference is made to FIG. 4, which schematically illustrates a method of combining received wireless communication RF signals, in accordance with some demonstrative embodiments. In some demonstrative embodiments, one or more of the operations of the method of FIG. 4, may be performed by any suitable wireless communication system, e.g., system 100 (FIG. 1); wireless communication device, e.g., device 102 (FIG. 1); and/or wireless communication unit, e.g., receiver 112 (FIG. 1).

As indicated at block 404, the method may include receiving from a RF module a first digital signal corresponding to a first preamble symbol of a wireless communication frame. The first digital signal may include a first combination of RF signals of the first preamble, respectively, received via first and second antennas. For example, phase estimator 132 (FIG. 1) may receive from RF combiner 122 (FIG. 1) signal 143 (FIG. 1) including a first preamble symbol of signal 107 (FIG. 1), e.g. corresponding to symbol 221 (FIG. 2), including a first combination of the first preambles of signal 141 (FIG. 1) and signal 142 (FIG. 1), respectively, received via antennas 110 (FIG. 1) and 113 (FIG. 1), e.g., as described above.

As indicated at block 405, the method may include receiving from the RF module a second digital signal corresponding to a second preamble symbol of the wireless communication frame. The second digital signal may include a second combination of RF signals of the second preamble, respectively, received via first and second antennas. For example, phase estimator 132 (FIG. 1) may receive from RF combiner 122 (FIG. 1) signal 143 (FIG. 1) including a second preamble symbol of signal 107 (FIG. 1), e.g. corresponding to symbol 222 (FIG. 2), including a second combination of the second preambles of signals 141 (FIG. 1) and 142 (FIG. 1), respectively, received via antennas 110 (FIG. 1) and 113 (FIG. 1), e.g., as described above.

As indicated at block 406, the method may include, providing the RF module with a feedback indicating a phase difference to be applied by the RF module based on the first and second digital signals. For example, phase estimator 132 (FIG. 1) may provide RF combiner 122 (FIG. 1) feedback 144 (FIG. 1) indicating the phase difference to be applied by RF combiner 122 (FIG. 1), based on the first and second digital signals, e.g., as described above.

In some demonstrative embodiments, as indicated at block 407, the method may include estimating the phase difference based on the first and second digital signals. For example, phase estimator 132 (FIG. 1) may estimate the phase difference based on the first and second signals, e.g., as described above.

In some demonstrative embodiments, as indicated at block 402, the method may include causing the RF module to use a first predefined phase difference for generating the first signal. For example, phase estimator 132 (FIG. 1) may cause RF combiner 122 (FIG. 1) to use a first predefined phase difference of zero degrees for generating the first signal, e.g., as described above.

In some demonstrative embodiments, as indicated at block 403, the method may include causing the RF module to use a second predefined phase difference for generating the second signal. For example, phase estimator 132 (FIG. 1) may cause RF combiner 122 (FIG. 1) to use a second predefined phase difference of 180 degrees for generating the second signal, e.g., as described above.

As indicated at block 408, the method may include combining RF signals of a data field of the frame received via the first and the second antennas based on the feedback indicating the phase difference. For example, RF combiner 122 (FIG. 1) may combine signal 141 (FIG. 1) and signal 142 (FIG. 1) of data field 205 (FIG. 2), based on feedback 144 (FIG. 1), e.g., as described above.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication receiver comprising:
   a radio-frequency (RF) combiner to combine first and second wireless communication RF signals of a wireless communication frame received via first and second respective antennas, into a combined signal; and a base-band phase estimator to cause said RF combiner to use a first phase difference to combine a first symbol of said first RF signal and a first symbol of said second RF signal into a first combined symbol, said phase estimator to cause said RF combiner to use a second phase difference being different from said first phase difference, to combine a second symbol of said first RF signal and a second symbol of said second RF signal into a second combined symbol, said phase estimator is to determine an estimated phase difference between said first and second antennas based on said first and second combined symbols, and to provide to said RF combiner a feedback corresponding to said estimated phase difference, wherein said radio-frequency combiner is to combine said first and second RF signals according to the feedback.

2. The receiver of claim 1, wherein said phase estimator is to determine said estimated phase difference based on said combined signal.

3. The receiver of claim 1, wherein said phase estimator is to determine said estimated phase difference based on a preamble of said wireless communication frame.

4. The receiver of claim 1, wherein said first and second phase differences are separated by 180 degrees.

5. The receiver of claim 1, wherein said first phase difference comprises a phase difference of zero degrees, and said second phase difference comprises a phase difference of 180 degrees.

6. The receiver of claim 1, wherein said feedback comprises a quantized value of said estimated phase difference.

7. The receiver of claim 6, wherein said phase estimator is to select said quantized value from a set of quantized phase difference values.

8. A method comprising:

receiving from a radio-frequency (RF) module a first digital signal corresponding to a first preamble symbol of a wireless communication frame, and a second digital signal corresponding to a second preamble symbol of said wireless communication frame, the first digital signal being based on a first combination, using a first phase difference, of a first RF signal of the first preamble symbol received via a first antenna and a second RF signal of the first preamble symbol received via a second antenna, and the second digital signal being based on a second combination, using a second phase difference being different from the first phase difference, of a first RF signal of the second preamble symbol received via the first antenna and a second RF signal of the second preamble symbol received via the second antenna;

based on said first and second digital signals, determining an estimated phase difference to be applied by said RF module to combine RF signals of at least a data field of said frame received via said first and second antennas; and providing said RF module with a feedback indicating the estimated phase difference.

9. The method of claim 8, wherein said first and second phase differences are separated by 180 degrees.

10. The method of claim 8, wherein providing said feedback comprises providing a quantized value of said estimated phase difference.

11. The method of claim 10 comprising selecting said quantized value from a set of quantized phase difference values.

12. A system comprising a wireless communication device, the wireless communication device including:

first and second antennas to receive wireless communication radio-frequency (RF) signals representing a wireless communication frame;

a RF combiner to combine said RF signals from said first and second antennas into a combined signal; and a base-band phase estimator to determine an estimated phase difference between said first and second antennas, and to cause said RF combiner to combine said RF signals based on said estimated phase difference, said phase estimator is to cause said RF combiner to use a first phase difference to combine RF signals of a first symbol received via said first and second antennas into a first combined symbol, said phase estimator is to cause said RF combiner to use a second phase difference to combine RF signals of a second symbol received via said first and second antennas into a second combined symbol, and said phase estimator is to determine said estimated phase difference based on said first and second combined symbols.

13. The system of claim 12, wherein said phase estimator is to determine said estimated phase difference based on a preamble of said frame received via said first and second antennas.

14. The system of claim 12, wherein said first and second phase differences are separated by 180 degrees.

15. The system of claim 12, wherein said base-band phase estimator is to provide said RF combiner with a quantized value of said estimated phase difference.

* * * * *